United States Patent [19]

Nishikawa et al.

[11] Patent Number: 5,527,617
[45] Date of Patent: Jun. 18, 1996

[54] METAL THIN FILM MAGNETIC RECORDING MEDIUM HAVING A SILICONE COMPOUND PROTECTIVE LAYER

[75] Inventors: Yasuo Nishikawa; Hiroshi Fukui, both of Kanagawa, Japan

[73] Assignees: Fuji Photo Film Co., Ltd., Kanagawa; Shiseido Company, Ltd., Tokyo, both of Japan

[21] Appl. No.: 363,993

[22] Filed: Dec. 27, 1994

Related U.S. Application Data

[63] Continuation of Ser. No. 136,710, Oct. 15, 1993, abandoned, which is a continuation of Ser. No. 915,292, Jul. 20, 1992, abandoned.

[30] Foreign Application Priority Data

Jul. 22, 1991 [JP] Japan .................... 3-204557

[51] Int. Cl.$^6$ ............................. G11B 5/00
[52] U.S. Cl. .................. 428/447; 428/457; 428/694 TF; 428/900
[58] Field of Search .............. 428/695, 694 TF, 428/694 BF, 900, 457, 447

[56] References Cited

U.S. PATENT DOCUMENTS

| | | | |
|---|---|---|---|
| 4,069,360 | 1/1978 | Yanagisawa | 428/64 |
| 4,152,487 | 5/1979 | Yanagisawa . | |
| 4,431,703 | 2/1984 | Somezawa | 428/447 |
| 4,540,615 | 10/1985 | Poliniak | 428/64 |
| 4,601,950 | 7/1986 | Iida et al. . | |

FOREIGN PATENT DOCUMENTS

| | | |
|---|---|---|
| 54-45103 | 4/1979 | Japan . |
| 59-77630 | 5/1984 | Japan . |
| 61-68725 | 4/1986 | Japan . |
| 62-89228 | 4/1987 | Japan . |

*Primary Examiner*—Stevan A. Resan
*Attorney, Agent, or Firm*—Sughrue, Mion, Zinn, Macpeak & Seas

[57] ABSTRACT

A metal thin layer type magnetic recording medium is disclosed, comprising a non-magnetic support having formed thereon (1) a ferromagnetic metal thin layer or (2) a ferromagnetic metal thin layer and a protective layer formed on the ferromagnetic metal thin layer, wherein a layer comprising a polymer of at least one chain or cyclic silicone compound which is formed on the surface of the ferromagnetic metal thin layer or the protective layer by bringing the silicone compound into contact with the surface in the vapor phase is provided on the surface; the atomic number ratio $(Si_{2p}/Co_{2p}^{3/2})$ of Si in the polymer is from 0.02 to 0.30; and the silicone compound is represented by formula (I):

$$(R^1HSiO)_a(R^2R^3SiO)_b(R^4R^5R^6SiO_{1/2})_c \quad (I)$$

wherein $R^1$, $R^2$, and $R^3$ each represents a hydrogen atom or a substituted or unsubstituted hydrocarbon group having from 1 to 10 carbon atoms, $R^1$, $R^2$, and $R^3$ simultaneously are not a hydrogen atom; $R^4$, $R^5$, and $R^6$ each represents a hydrogen atom or a substituted or unsubstituted hydrocarbon group having from 1 to 10 carbon atoms; a and b each represents an integer of 0 or more; and c represents 0 or 2, when c is 0, the silicone compound is a cyclic compound, when c is 2, the silicone compound is a chain compound, and when c is 0, the sum of a and b is an integer of at least 3.

3 Claims, No Drawings

METAL THIN FILM MAGNETIC RECORDING MEDIUM HAVING A SILICONE COMPOUND PROTECTIVE LAYER

This is a continuation of application No. 08/136,710 filed Oct. 15, 1993, now abandoned, which is a continuation of 07/915,292 filed Jul. 20, 1992, now abandoned.

FIELD OF THE INVENTION

The present invention relates to a magnetic recording medium having a ferromagnetic metal thin film as a magnetic layer. More particularly, the present invention relates to a metal thin layer type magnetic recording medium with excellent weather resistance and/or running property (abrasion resistance and sliding property).

BACKGROUND OF THE INVENTION

Hitherto, as a magnetic recording medium, in addition to a coating type magnetic recording medium formed by coating a dispersion of a ferromagnetic powder in an organic high molecular compound binder on a non-magnetic support, a so-called metal thin layer type magnetic recording medium has been used having a ferromagnetic metal thin layer formed by a vapor deposition method (such as a vacuum vapor deposition method, a sputtering method, an ion plating method, etc.) or a plating method (such as an electroplating method, an electroless plating method, etc.), as the magnetic layer for high density recording. This so-called metal thin layer type magnetic recording medium does not use a binder.

As a method of forming a magnetic layer, having the desired coercive force and squareness ratio, for a magnetic recording medium by a vacuum vapor deposition (which is a typical thin film (or layer) forming method), an oblique-incident vapor deposition method is known as disclosed in U.S. Pat. Nos. 3,342,632 and 3,342,633.

In regard to the magnetic recording medium having a ferromagnetic metal thin film as the magnetic layer, desired properties cannot be achieved with respect to weather resistance, abrasion resistance, and running property.

That is, a magnetic layer composed of a ferromagnetic metal thin film has a tendency to corrode, although the magnetic layer has excellent recording and reproducing characteristics. Also, a magnetic recording medium is placed in relative high speed movement with a magnetic head during recording, reproducing, and erasing of magnetic signals. For a metal thin layer type magnetic recording medium having a very smooth surface, it is difficult to smoothly and stably run the magnetic recording medium, and to prevent abrasion and/or the destruction with a magnetic head. Therefore, it is very important for the practical use of a metal thin layer type magnetic recording medium to overcome these difficulties.

In view of the foregoing, a lubricant layer or a protective layer provided on the surface of the metal thin layer type magnetic recording medium (for improving the weather resistance and the running property thereof) has been considered and investigated.

Surface protective materials for the metal thin layer type magnetic recording medium include oxides such as silicon oxide, etc., formed in a vapor phase or a liquid phase; organic polymers formed by a sputtering, a plasma polymerization, etc.; diamond-like carbon; graphite-like carbon; thermoplastic resins; thermosetting resins; etc.

A layer formed by coating a solution of a lubricating material such as fatty acids, metal salts of fatty acids, fatty acid esters, alkylphosphoric acid esters, perfluoropolyether components, polar group-modified perfluoropolyether series compounds, etc., and a layer formed by a Langmuir Blodgett method as described, e.g., in JP-A-60-69824 and JP-A-60-85427 (the term "JP-A", as used herein, means an "unexamined published Japanese patent application") are known as the foregoing lubricant layer.

Also, it has been attempted to coat the surface of the metal thin layer type magnetic recording medium with an organic silicone compound(s). For example, JP-A-62-89228 discloses a technique for applying a siloxane polymer or a ladder type silicone compound onto the surface of the magnetic layer, and JP-A-54-45103 and JP-A-59-77630 both disclose a technique for treating or coating the surface of the magnetic layer with a coupling agent such as an alkoxysilane, etc.

However, in particular, when the protective layer is thin, the metal thin layer type magnetic recording medium has the disadvantages that the electromagnetic characteristics are deteriorated when stored at a high temperature and in high humidity. Further, the running property such as high speed abrasion resistance and abrasion resistance to materials having smooth surfaces under a severe condition (such as low humidity, high humidity, etc.) are insufficient.

These disadvantages are caused by the foregoing silicone coatings because the molecular weight of the silicone existing at the surface of the magnetic layer cannot be significantly increased.

That is, the foregoing disadvantages are caused due to the requirement that the layer of the silicone compound be formed on the magnetic layer by dissolving the silicone compound in an organic solvent and coating the solution on the magnetic layer.

SUMMARY OF THE INVENTION

An object of the present invention is, therefore, to provide a metal thin layer type magnetic recording medium with excellent weather resistance, running property (abrasion resistance, sliding property, etc.), and electromagnetic characteristics.

It has now been discovered that the foregoing object can be attained by the present invention as set forth hereinbelow.

That is, according to the present invention, there is provided a metal thin layer type magnetic recording medium comprising a non-magnetic support having formed thereon (1) a ferromagnetic metal thin layer or (2) a ferromagnetic metal thin layer and a protective layer formed on the ferromagnetic metal thin layer, wherein the magnetic recording medium further has a layer comprising a polymer of at least one chain or cyclic silicone compound represented by formula (I) on the ferromagnetic metal thin layer or the protective layer, which is formed by bringing the silicone compound into contact with the surface of the ferromagnetic metal thin layer or the protective layer in the vapor phase,

$$(R^1HSiO)_a(R^2R^3SiO)_b(R^4R^5R^6SiO_{1/2})_c \qquad (I)$$

wherein $R^1$, $R^2$, and $R^3$ each represents a hydrogen atom or a hydrocarbon group having from 1 to 10 carbon atoms, which may be substituted or not, provided that $R^1$, $R^2$ and $R^3$ are not simultaneously a hydrogen atom; $R^4$, $R^5$, and $R^6$ each represents a hydrogen atom or a hydrocarbon group having from 1 to 10 carbon atoms, which may be substituted or not; a and b each represents an integer of 0 or more, and c represents 0 or 2; when c is 0, the silicone compound is a cyclic compound and when c is 2, the silicone compound is a chain compound and, also, when c is 0, the sum of a and b is an integer of at least 3; and further the atomic number ratio $(Si_{2p}/Co_{2p}^{3/2})$ of Si in the polymer is from 0.02 to 0.30.

Also, it has further been discovered that the foregoing object can be effectively attained by a metal thin layer type magnetic recording medium having the layer comprising the polymer of the silicone compound represented by formula (I) on the surface of the ferromagnetic metal thin layer or the surface of the protective layer as described above, where the polymer of the polymer layer is reacted with a compound capable of being reacted with the Si-H moiety of the polymer after being formed as the polymer layer.

That is, according to another embodiment of the present invention, there is provided a metal thin layer type magnetic recording medium comprising a non-magnetic medium having thereon (1) a ferromagnetic metal thin layer or (2) a ferromagnetic metal thin layer and a protective layer formed on the ferromagnetic metal thin layer, wherein the magnetic recording medium has a layer comprising a polymer of at least one chain or cyclic silicone compound represented by formula (I) formed on the surface of the ferromagnetic metal thin layer or the protective layer by bringing the silicone compound into contact with the surface of the ferromagnetic metal thin layer or the protective layer formed on the ferromagnetic metal thin layer in the vapor phase, with the polymer of the polymer layer having been reacted with a compound capable of reacting with the Si-H moiety of the polymer.

DETAILED DESCRIPTION OF THE INVENTION

The present invention is described in detail below.

The most important feature of the present invention is that the polymer of the silicone compound, represented by formula (I), is formed on the ferromagnetic metal thin layer (hereinafter, sometimes referred to as the magnetic layer) or on the protective layer formed on the magnetic layer by a vapor phase reaction, whereby a polymer of the silicone compound having a very large molecular weight is densely formed as the polymer layer. In particular, by forming the polymer layer as described above, bonding of the polymer and the surface of the magnetic layer or the protective material is strengthened, and this is considered to be due to strengthening the electrostatic bonding with the metal of the magnetic layer or the protective material through oxygen in the polymer.

Also, in the other embodiment of the present invention, the denseness by which the foregoing polymer layer is attained is increased by (1) reacting the Si-H moiety in the polymer with a compound capable of reacting therewith and (2) selecting a compound having a functional group which specifically functions as the compound reacting with the Si-H moiety of the polymer.

The metal thin layer type magnetic recording medium of the present invention has excellent weather resistance and running property when compared with conventional metal thin layer type magnetic media. Such advantages are believed to be the result of the silicone compound formed on the surface of the metal thin layer type magnetic recording medium of the present invention having a very dense structure and a larger molecular weight (when compared with silicone compounds used in conventional metal thin layer type magnetic media).

In the case of conventionally investigated techniques (such as the formation of a layer of a siloxane polymer or a ladder type silicone compound on the surface of the magnetic layer and the treatment or coating of the surface of the magnetic layer with a coupling agent such as an alkoxysilane, etc.), the molecular weight of the silicone compound cannot be increased significantly because, as mentioned previously, dissolution of the silicone compound and coating the solution is required.

On the other hand, in forming the silicone polymer in the present invention (hereinafter, the polymer is sometimes referred to simply as the polymer of the present invention), a dense and large-scale polymerization occurs. Accordingly, excellent weather resistance such as a gas barrier property, etc., and abrasion resistance, which have never been obtained by conventional techniques, are achieved.

After the formation of the polymer of the present invention, the polymer layer is treated with a compound capable of reacting with Si-H (present in the polymer of the present invention), such as a compound having a carbon-carbon unsaturated bond, and the surface of the specific polymer of the present invention becomes even more dense, whereby the running property of the magnetic recording medium exposed to a magnetic head, guide poles, etc., under severe conditions such as a high and low humidity conditions, etc., is greatly increased.

In particular, the excellent running property obtained by reacting Si-H of the polymer of the present invention and an unsaturated compound having a functional group such as a long chain aliphatic group, etc., is considered to be caused by the boundary lubricating action of the aliphatic chain.

The polymer of the present invention is formed on the surface of a magnetic layer or the surface of a protective layer formed on the magnetic layer. In the latter case, the protective layer may be formed on the whole surface of the magnetic layer or partially on the surface of the magnetic layer in a mottled (discontinuous) state. Also, the polymer layer may or may not be a continuous layer, or may coat the whole surface or partially coat the layer.

In addition, the polymer composition of the present invention may be optionally selected if the polymer is composed of the silicone compound for use in the present invention, i.e., composed of at least one kind of the silicone compound represented by formula (I).

The weight average molecular weight of the polymer of the present invention is usually at least 150,000.

The amount of the polymer of the present invention which is present is measured by XPS (X-ray Photoelectron Spectroscopy) in ESCA (Electron Spectroscopy for Chemical Analysis). When the main component of the magnetic layer of the present invention is, for example, Co, the amount of the polymer which is present can be defined by the atom number ratio $(Si_{2p}/Co_{2p}^{3/2})$ of Si in the polymer and Co of the magnetic layer. In the present invention, the ratio is controlled to a value of 0.02 to 0.30 and preferably, 0.1 to 0.2.

The silicone compound of formula (I) for use in the present invention is largely classified into two groups.

The first group is the silicone compounds represented by formula (I) wherein c is 0, that is, cyclic silicone compounds represented by formula (II):

$$(R^1HSiO)_a(R^2R^3SiO)_b \tag{II}$$

wherein $R^1$, $R^2$, $R^3$, a, and b have the same meaning as described above in regard to formula (I). It is desirable that $R^1$, $R^2$, and $R^3$ each is a hydrocarbon group having from 1 to 10 carbon atoms and, preferably, from 1 to 6 carbon atoms, e.g., an alkyl group, etc., which may be mutually or independently substituted with a substituent such as a halogen atom, and the sum of a and b is an integer of at least 3 and, preferably, from 3 to 6.

Specific examples of the silicone compound represented by formula (II) are compound (A) and compound (B) represented by the following formulae:

Compound (A):

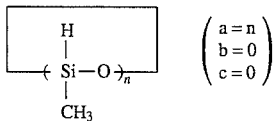

Compound (B):

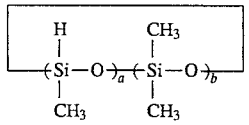

Compound (A) and compound (B) represented by the above formulae can be used singly or as a mixture thereof.

In the foregoing formulae showing compound (A) and compound (B), n (or a+b) is preferably an integer of from 3 to 6. If the value of n (or a+b) is less than 3, the boiling point of each compound is lowered, thereby the compound is quickly evaporated and the speed of adsorbing onto the surface of the magnetic layer or the protective layer is increased. The trimer and the tetramer of each of the foregoing compounds are particularly suitable since such a compound is easily polymerized owing to the compound's steric properties.

Specific examples of cyclic silicone compounds represented by formula (II) are as follows:
(II)-1: Dihydrogen hexamethylcyclotetrasiloxane
(II)-2: Trihydrogen pentamethylcyclotetrasiloxane
(II)-3: Tetrahydrogen tetramethylcyclotetrasiloxane
(II)-4: Dihydrogen octamethylcyclopentasiloxane
(II)-5: Trihydrogen heptamethylcyclopentasiloxane
(II)-6: Tetrahydrogen hexamethylcyclopentasiloxane
(II)-7: Pentahydrogen pentamethylcyclopentasiloxane The second group of the compounds represented by formula (I) corresponds to the case of the silicone compound of formula (I) wherein c is 2, that is, chain silicone compounds represented by formula (III):

$$(R^1HSiO)_a(R^2R^3SiO)_b(R^4R^5R^6SiO_{1/2})_2 \quad (III)$$

wherein $R^1$, $R^2$, $R^3$, $R^4$, $R^5$, and $R^6$ each represents independently a hydrogen atom or a hydrocarbon group having from 1 to 10 carbon atoms, which may be substituted with a substituent, provided that $R^1$, $R^2$, and $R^3$ do not simultaneously represent a hydrogen atom; a and b each represents an integer of 0 or more. In formula (III), it is preferable that $R^1$, $R^2$, $R^3$, $R^4$, $R^5$, and $R^6$ each represents independently or mutually a hydrocarbon group having from 1 to 10 carbon atoms and, preferably, from 1 to 6 carbon atoms, such as an alkyl group, etc., which may be substituted with a substituent, and the sum of a and b is an integer of at least 3 and, preferably, from 3 to 6.

A typical example of the silicone compound represented by formula (III) is compound (C) represented by the following formula:

Compound (C):

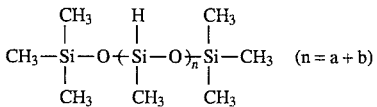

wherein n represents an integer of from 2 to 5.

Specific examples of chain silicone compounds represented by formula (III) are shown below:
(III)-1: 1,1,1,3,5,7,7,7-Octamethyltetrasiloxane
(III)-2: 1,1,1,3,5,7,9,9,9-Nanomethylpentasiloxane
(III)-3: 1,1,1,3,5,7,9,11,11,11-Decamethylhexasiloxane In the present invention, as the method for forming the polymer of the present invention on the surface of the ferromagnetic metal thin layer or the surface of the protective layer formed thereon (hereinafter, the surface is referred to as the surface of the base plate), there is no particular restriction so long as the method is a vapor phase reaction method.

As a specific method of preparing the polymer of the present invention, the vapor of the silicone compound is brought into contact with the surface of the ferromagnetic metal thin layer or the protective layer (the base plate) in a chamber filled with a gas containing the vapor of the silicone compound at a temperature of preferably not higher than 120° C. and, more preferably, from 0° C. to 100° C. and at a pressure of not higher than atmospheric pressure, preferably not higher than 200 mm Hg and, more preferably, from $10^{-2}$ to 100 mm Hg.

For contacting the silicone compound for use in the present invention with the surface of the base plate, an optional method can be employed. For example, there is a method of bringing the vapor of the silicone compound for use in the present invention into contact with the surface of the base plate by means of a roll to coat the surface of the base plate with the polymer of the present invention.

The vapor of the silicone compound for use in the present invention may be introduced into the chamber by an optional method but it is preferable to introduce the vapor of the silicone compound as a mixed gas thereof with a carrier gas.

The carrier gas can be mixed with the vapor of the silicone compound for use in the present invention by, if desired, heating the silicone compound until the vapor pressure of the compound becomes 1 mm Hg and then introducing a carrier gas stream into the silicone compound or onto the surface of the silicone compound.

The supplying rate of the carrier gas stream can be appropriately determined according to the vapor pressure of the silicone compound, the kind and amount of the base plate, and the volume of the processing container. In this case, it is preferable for the base plate to be treated with a mixed gas from 1 minute to 100 hours. Also, for stably forming the polymer layer having a uniform thickness, it is more preferred to treat the base plate with the mixed gas from 10 minutes to 100 hours.

As the carrier gas, an inert gas such as nitrogen, argon, helium, etc., is preferably used, also air, or a mixture of the foregoing inert gas and steam, methanol vapor, or ethanol vapor, may be used.

In the other embodiment of the present invention, after contact-treating the surface of the base plate (the ferromagnetic metal thin layer or the protective layer) with the foregoing specific silicone compound in the vapor phase, the surface of the polymer layer thus-formed is brought into contact with a compound capable of reacting with Si-H which is present in the polymer layer (hereinafter, the compound is referred to as the modifying compound) to cause the reaction. In the present invention, there is no particular restriction on the method of carrying out the contact and the reaction.

The modifying compound includes any optional compounds without particular restriction on the structures provided they can react with Si-H to form a covalent bond between Si and the atom constituting the modifying compound. Also, it is preferable that the modifying compound has a functional group which is not lost by the bonding reaction.

As the functional group, examples include an aliphatic group, an aromatic group, and an aliphatic group having a reactive group.

Examples of the modifying compound are a compound having a group capable of addition-reacting with Si-H, e.g., OH and SH, such as an amino acid (e.g., cysteine) and a compound having a carbon-carbon unsaturated bond capable of reacting with Si-H, such as, for example, an unsaturated compound represented by formula (IV):

(IV)

wherein $R^7$, $R^8$, $R^9$, and $R^{10}$ each represents mutually or independently a hydrogen atom, a halogen atom, a hydroxy group, a mercapto group, an acyloxy group, an alkoxy group, an amino group, a nitro group, a carboxy group, a sulfo group, or a substituted or unsubstituted hydrocarbon group having from 1 to 30 carbon atoms (such as an aliphatic group, an aromatic group, a heterocyclic group, an alicyclic group, a spiro compound residue, or a terpene compound residue, or $R^7$ and $R^9$ each represents a carbon-carbon bond and can form a -C≡C- bond together with a -C=C- bond or $R^7$ and $R^9$ each can form an alicyclic group together with -C=C-).

In the compound represented by formula (IV), the hydrocarbon groups represented by $R^7$, $R^8$, $R^9$ and $R^{10}$ each may be substituted by at least one unsaturated hydrocarbon group and at least one functional group without adversely influencing the addition-reaction by the double bond or the triple bond of the compound.

Specific examples of the compound represented by formula (IV) are alkenes such as α-olefin, etc., acrylic acid derivatives such as acrylates, methacrylates, acrylamide, methacrylamide, etc., and vinyl compounds such as fatty acid vinyl esters, etc. In these unsaturated compounds, the compounds having a fluorinated aliphatic chain, a fluorinated polyether chain, or a long chain aliphatic group having at least 10 carbon atoms (e.g., vinyl esters of a one terminal carboxylic acid type perfluoropolyether, etc.) can particularly increase the running property of the magnetic recording medium of the present invention.

Specific examples of the compound represented by formula (IV) are as follows.
(IV)-1: 1-Dodecene
(IV)-2: 1-Octadecene
(IV)-3: Octadecyl acrylate
(IV)-4: 2,2,3,3,4,4,5,5,6,6,7,7,8,8,9,9,9-Heptadecafluorononyl acrylate
(IV)-5: 2,2,3,3,4,4,5,5,6,6,7,7,8,8,9,9-Hexadecafluorononyl acrylate
(IV)-6: F[CF(CF$_3$)CF$_2$O]$_{15}$-COOCH$_2$-CH=CH$_2$
(IV)-7: Vinyl perfluorononanate
(IV)-8: Glycerol-α-monoallyl ether
(IV)-9: Allyl glycidyl ether The addition-reaction of the compound capable of reacting with the Si-H moiety of the polymer of the present invention (formed by bringing the silicone compound for use in the present invention into contact with the surface of the base plate) can be carried out by bringing the foregoing compound into contact with the surface of the polymer layer in the vapor phase or the liquid phase in the presence of a catalyst at a temperature of not higher than 300° C., and preferably from 0° C. to 250° C. for at least 1 minute (for preferably at least 20 minutes).

In the foregoing addition-reaction, platinum group catalysts, i.e., the compounds of ruthenium, rhodium, palladium, osmium, iridium, and platinum are suitable, and compounds of platinum and palladium are particularly suitable, as the catalyst.

Specific examples of palladium series catalysts include palladium(II) chloride, ammonium tetraaminepalladium-(II) chloride, palladium(II) oxide, etc. Examples of the platinum series catalyst include platinum(II) chloride, tetrachloroplatinic(II) acid, platinum(IV) chloride, ammonium hexachloroplatinate(IV), platinum(II) oxide, platinum(II) hydroxide, platinum(IV) oxide, platinum(IV) sulfide, potassium hexachloroplatinate(IV), etc.

Also, tri-n-alkyl (having from 1 to 8 carbon atoms) methyl ammonium chloride or tri-n-alkylamine is added to the palladium series compound or the platinum series compound and, after carrying out an ion pair extraction with a water-organic solvent system, the organic solvent phase thus-obtained can be used. Furthermore, an amine catalyst such as tributylamine, etc., or a polymerization initiator can be used.

The addition-reaction can also be carried out by utilizing ultraviolet rays, γ rays, electron rays, plasma, etc.

The effects of the present invention can be seen when, after forming the polymer of the present invention on the base plate, the polymer layer is treated with the foregoing modifying compound to cause the reaction of Si-H of the polymer and the modifying compound, the surface of the dense silicone polymer becomes even more dense. When an unsaturated compound having a long chain aliphatic group as the functional group is used for the reaction as the modifying agent, the effect of improving the running property is particularly remarkable. This is considered to be caused by a boundary lubricating action of the aliphatic chain.

The amount of the modifying compound can be selected, as desired, and the modifying compound can be reacted with all or part of the Si-H which is present in the surface of the polymer layer of the present invention, and is preferably reacted with all of the Si-H. Accordingly, in the case of reacting the modifying compound and said Si-H, the amount of the modifying compound is in the range of at least 0.1 times equivalent, preferably from 1 to 10 times equivalent, and particularly preferably from 1.2 to 3 times equivalent to the equivalent number of all reactable Si-H. If the modifying compound is used in an excessive amount, after the treatment, a step of cleaning the surface of the polymer layer is required and, to omit this step, the optimum amount of the modifying compound should be selected. After the reaction, the concentration of the modifying compound or the catalyst is lowered, and the compound or the catalyst can be further added to perform a subsequent reaction.

The magnetic recording medium of the present invention is composed of a non-magnetic support having thereon directly, or through a subbing layer, the magnetic layer and, as the case may be, a protective layer can be formed on the magnetic layer.

When the magnetic recording medium of the present invention is in a tape form, a back coat layer can be formed on the back surface of the support (the surface opposite to the surface formed the ferromagnetic metal thin layer).

As the material for the non-magnetic support, there are polyesters such as polyethylene terephthalate, etc.; polyolefins such as polyethylene, polypropylene, etc.; cellulose derivatives such as cellulose triacetate, cellulose diacetate, cellulose acetate butyrate, etc.; vinylic resins such as polyvinyl chloride, polyvinylidene chloride, etc.; other polymers such as polycarbonate, polyimide, polyamideimide, etc.; light metals such as an aluminum alloy, a titanium alloy, etc.; and, ceramics such as alumina glass, etc.

The form of the non-magnetic support may be a film, a sheet, a disc, a card, a drum, etc.

On the surface of the foregoing non-magnetic support may be formed at least one kind of protrusions such as hill-form protrusions, crease-form protrusions, granular protrusions, etc., for controlling the surface roughness.

The foregoing hill-form protrusions can be formed by incorporating inorganic fine particles having grain sizes of from 500 to 3,000 Å in the high molecular film support during the formation of the high molecular film support. The height of the protrusions from the surface of the high molecular film is generally from 100 to 1,000 Å, and the density of the protrusions is from about $1 \times 10^4$ to $10 \times 10^4$ protrusions/mm$^2$. As the inorganic fine particles for forming the hill-form protrusions, particles of calcium carbonate, silica, alumina, etc., are suitable.

The foregoing crease-form protrusions are formed by coating a diluted solution of a resin using a specific solvent mixture followed by drying. The height of the protrusions is generally from 0.01 to 10 μm and, preferably, from 0.03 to 0.5 μm. The shortest distance between the protrusions is from 0.1 to 20 μm.

As the resin for forming the crease-form protrusions, unsaturated polyesters such as polyethylene terephthalate, polyethylene naphthalate and various kinds of resins such as polyamide, polystyrol, polycarbonate, polyacrylate, polysulfone, polyether sulfone, polyvinyl chloride, polyvinylidene chloride, polyvinyl butyral, polyphenylene oxide, a phenoxy resin, etc., may be used singly or as a mixture thereof and, particularly, the resins each having a soluble solvent are suitable.

The resin is dissolved in a first solvent at a resin concentration of from 1 to 1,000 ppm and then, after adding thereto a second solvent having a higher boiling point than the first solvent in an amount of from 10 to 100 times the amount of the resin, the solution thus-obtained is coated on the surface of the high molecular film support followed by drying to form a thin film having a very fine crease-form unevenness.

Furthermore, in the present invention, granular protrusions may be formed on the surface of the non-magnetic support. The granular protrusions can be formed by attaching organic fine particles of an acrylic resin, etc., or inorganic fine particles such as a silica powder, a metal powder, etc., in a spherical form or a semi-spherical form. The height of the granular protrusions is from 50 to 500 Å, and the density thereof is from $1 \times 10^6$ to $50 \times 10^6$ protrusions/mm$^2$.

By forming at least one kind of the protrusions on the surface of the non-magnetic support, the surface property of the ferromagnetic metal thin layer (which is the magnetic layer) is controlled. However, by combining two or more kinds of these protrusions, the surface property controlling effect is increased and, in particular, by forming the crease-form protrusions and the granular protrusions on the surface of a film support (a base film) having thereon the hill-form protrusions, the durability and the running property of the magnetic recording medium can be greatly improved.

In the present invention, the height of the all protrusions is preferably within the range of from 100 to 2,000 Å, and the density thereof is preferably from $1 \times 10^5$ to $1 \times 10^7$ protrusions/mm$^2$.

In the present invention, an interlayer composed of a metal, a metal oxide, an organic compound, etc., can be formed between the non-magnetic support and the ferromagnetic metal thin layer in order to improve the adhesion of the magnetic layer and the support and absorb the shock with a metal head.

The ferromagnetic metal thin layer (as the magnetic layer) is formed on a non-magnetic support as a continuous layer by a vacuum film-forming technique such as a vacuum vapor deposition method, an ion plating method, a sputtering method; an electroplating method; a nonelectroplating method, etc.

In the foregoing vacuum vapor deposition method, a ferromagnetic metal material is evaporated in a vacuum of from $1 \times 10^{-4}$ to $1 \times 10^{-2}$ Torr by low-resistance heating, high frequency heating, electron beam heating, etc., and the vapor thereof is deposited on the surface of the support. In general, for obtaining a high coercive force, an oblique-incident vapor deposition method, wherein the vapor of a ferromagnetic metal material is slantingly deposited onto the support, is employed. Also, for obtaining a higher coercive force, the foregoing oblique-incident vapor deposition method, wherein the vapor deposition is carried out while introducing oxygen or oxygen and argon into the chamber as an atmosphere, is preferably employed.

Also, as a method of introducing oxygen into the ferromagnetic metal thin layer, in addition to the foregoing method of carrying out the vapor deposition in the presence of oxygen, a method wherein a ferromagnetic metal thin layer, formed by the vapor deposition in the absence of oxygen, is forcibly oxidized in an oxygen-containing atmosphere at 60° C. and 30% RH, whereby the surface of the support opposite to the magnetic layer (i.e., a backing layer) can be oxidized.

Examples of the ferromagnetic metal material, which are used when forming the ferromagnetic metal thin layer by such a vacuum film-forming technique, include metals such as Fe, Co, Ni, etc.; alloys such as a Co-Ni alloy, a Co-Pt alloy, a Co-Ni-Pt alloy, an Fe-Co alloy, an Fe-Ni alloy, an Fe-Co-Ni alloy, an Fe-Co-B alloy, a Co-Ni-Fe-B alloy, and a Co-Cr alloy. These alloys may further include a metal such as Mo, W, Ge, Cr, Al, Si, V, Nb, Ta, Ga, As, Sr, Zr, Rh, Pd, Sn, Sb, Te, Pm, Re, Os, Ir, Au, Hg, Pb, Bi, etc., or the oxides, nitrides, etc., of these metals.

More specifically, as the preferred ferromagnetic metal thin layer, there are magnetic layers formed by slantingly vapor-depositing Co-Ni in an oxygen stream, a magnetic layer formed by slantingly vapor-depositing Co in an oxygen stream, a magnetic layer formed by perpendicularly vapor-depositing Co-Cr or, preferably, using two evaporation sources of Co and Cr, and a magnetic layer formed by sputtering (DC sputtering, RF sputtering, etc.) Co-Cr.

The surface of the base plate is frequently oxidized by the oxygen introduced into the magnetic layer or by the oxidation-treatment after the formation of the magnetic layer but the treatment in the present invention can be applied regardless of the presence or absence of the surface oxidation.

The thickness of the magnetic layer formed by the foregoing method is generally from about 0.04 to 1 μm and, preferably, from about 0.05 to 0.5 μm.

In the present invention, a preferred embodiment of the base plate is not coating or staining the base plate with a material such as organic matter in the air, which does not have an accelerating action for the polymerization of the silicone compound represented by formula (I).

For this problem, it is preferred that after forming the magnetic layer or the protective layer, the base plate is brought into contact with the silicone compound in the vapor phase (from the apparatus for forming the magnetic layer or the protective layer) without passing through the air, and also after forming the magnetic layer or the protective layer, the base plate is preferably stored in air from which gases such as oxygen, nitrogen, etc., and organic matter is removed before the oxidation-treatment or the vapor phase contact with the silicone compound.

Suitable materials for the protective layer formed on the ferromagnetic metal thin layer are oxides such as silicon oxide, etc., formed in a vapor phase or a liquid phase; organic polymers formed by sputtering, plasma polymerization, etc.; diamond-like carbon, graphite-like carbon, thermoplastic resins, thermosetting resins, etc. In these materials, the carbon series protective material formed by a sputtering method is preferred, and the oxide series protective materials are most preferred.

In the case of a magnetic recording tape, a back coating layer is frequently formed. The back coating layer is formed by coating a back coating composition prepared by dispersing a binder resin and a powder component in an organic solvent on the back side of the non-magnetic support.

As the binder resin used for the back coating composition, there are vinyl chloride series polymers; vinyl chloride-vinyl acetate series copolymers; vinyl chloridevinyl propionate series copolymers; vinylidene chloride-vinyl acetate series copolymers; copolymers of vinyl chloride and vinyl alcohol; maleic acid and/or acrylic acid; vinyl chloride-vinylidene chloride series copolymers; vinyl chloride-acrylonitrile series copolymers; ethylene-vinyl acetate series copolymers; cellulose derivatives such as a nitrocellulose resin, etc.; acrylic resins; polyvinyl acetal resins; polyvinyl butyral resins; epoxy resins; phenoxy resins; polyurethane resins, etc.

Furthermore, for improving the dispersibility of the powder components, a binder resin having a hydrophilic polar group may be used. Specifically, polyurethane resins, polyester resins, vinyl chloride series polymers., vinyl chloride-vinyl acetate series copolymers, vinyl chloride-propionic acid series copolymers, vinylidene chloride-vinyl acetate series resins, etc., each having at least one kind of polar group selected from $-SO_3M$, $-OSO_3M$, $-PO_3M_2$, $-OPO_3M_2$, and $-CO_2M$ (wherein M represents a hydrogen atom, an alkali metal or ammonium) in the molecule are preferably used. In the foregoing polar groups, $-SO_3M$ and $-CO_2M$ are preferred and $-SO_3M$ is more preferred.

The content of the polar group is preferably from about $1 \times 10^{-7}$ to $1 \times 10^{-3}$ equivalent and, more preferably, from $1 \times 10^{-5}$ to $5 \times 10^{-4}$ equivalent per gram of the polymer or the copolymer. The resin may have one kind of polar group or may have 2 or more kinds of polar groups. Also, when the resin further has a hydroxy group, the dispersibility is more improved.

The foregoing high molecular binders can be used singly or as a mixture thereof, and can be subjected to a hardening treatment by the addition of a known isocyanate series crosslinking agent (e.g., three tolylene diisocyanate addition products of trimethylolpropane). Also, a monomer composed of acrylic acid ester series oligomer and monomer, which can be hardened by the irradiation with radiation, can be used.

On the other hand, the foregoing powder component can be a carbon black fine powder for imparting an electroconductivity to the back coating layer and inorganic pigments (which are added for controlling the surface roughness and improving the durability of the magnetic recording tape) such as $\alpha$-FeOOH, $\alpha$-Fe$_2$O$_3$, $\alpha$-Al$_2$O$_3$, Cr$_2$O$_3$, TiO$_2$, ZnO, SiO, SiO$_2$, CaCO$_3$, MgCO$_3$, Sb$_2$O$_3$, etc., may be used.

Furthermore, conventionally known various organic solvents can be used as the organic solvent for the foregoing back coating composition.

In the present invention, after vapor-phase treating the base plate with the silicone compound for use in the present invention or after treating, thereafter, with the modifying compound, a conventionally known lubricant for magnetic recording media may be applied thereto. For example, by using a fluoropolyether series lubricant, the durability of the magnetic recording medium is more improved.

There is no particular restriction on the surface form of the magnetic layer of the magnetic recording medium of the present invention but as described hereinbefore, when the magnetic layer has protrusions having a height of from 10 to 1,000 Å (by forming the magnetic layer after applying fine particles in or on the surface of the non-magnetic support), the magnetic recording medium has particularly excellent running property and durability.

In the case of a flexible medium, the thickness of the non-magnetic support is generally from 4 to 50 μm and, preferably, from 6 to 50 μm.

The following examples are intended to illustrate the present invention but not to limit it in any way. Unless otherwise indicated, all parts, percents, ratios and the like are by weight.

EXAMPLE 1

On the polyethylene terephthalate film having a thickness of 13 μm, was slantingly vapor-deposited a cobalt-nickel layer (thickness of 150 nm) to provide a base plate for a magnetic recording medium. An electron beam evaporation source boat was used as an evaporation source boat, a cobalt-nickel alloy (Co: 80% by weight, Ni: 20% by weight) was charged in the boat and an oblique-incident vapor deposition was carried out in a vacuum of $5 \times 10^{-5}$ Torr at an incident angle of 50° (Base Plate A).

Then, the surface of the magnetic layer of Base Plate A was subjected to a contact-treatment with tetrahydrogen tetramethylcyclotetrasiloxane (compound (II)-3 illustrated hereinbefore as the silicone compound for use in the present invention) by means of a roll for one minute under the conditions of a saturated vapor pressure under atmospheric pressure and 90° C. such that the atom number ratio ($Si_{2p}/Co_{2p}^{3/2}$) (the atom number ratio of Si in the polymer of the present invention to the atom (Co) of the magnetic layer measured by ESCA) became 0.1, whereby the silicone compound for use in the present invention was polymerized, and then Sample No. 1, having a coating of the polymer of the present invention on the surface of the magnetic layer, was prepared.

EXAMPLES 2 AND 3

By following the same procedure as Example 1, except for the changes shown in Table 1 below, Sample Nos. 2 and 3 were prepared.

EXAMPLE 4

After forming the polymer layer of the silicone compound for use in the present invention under the conditions shown in Table 1 below, chloroauric acid was added to an isopropanol solution of about 2% 1-octadecene (which was the modifying compound at a concentration of 50 ppm), the base plate having the polymer layer on the ferromagnetic metal (Co-Ni) thin layer was dipped in the solution for 10 minutes to add the modifying compound to Si-H in the polymer and to provide Sample No 4.

EXAMPLE 5

By following the same procedure as Example 4, except for the changes described in Table 1 below, Sample No. 5 was prepared.

EXAMPLES 6 TO 8

After preparing Base Plate A as in Example 1, a carbon black protective layer having an average thickness of 2 nm was formed on the surface of the magnetic layer by RF sputtering (13.5 MHz) to provide Base Plate B.

On the Base Plate B for the magnetic recording medium thus-obtained was applied the silicone compounds (for use in the present invention) shown in Table 1 below. In Example 8, the modifying compound shown in Table 1 below was further provided.

20° C. of 200 cSt) as a lubricant in place of the vapor treatment with the silicone compound for use in the present invention, Comparative Sample No. 12 was prepared.

COMPARATIVE EXAMPLE 5

By coating the surface of the protective layer of Base Plate B, prepared as described above, with 10 mg/m$^2$ of a stearic acid-modified silicone (Compound (a)) having the mean structure shown below in place of applying the vapor treatment with the silicone compound for use in the present invention, Comparative Sample No. 13 was prepared.

Compound (a):

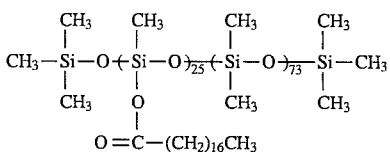

$$O=C-(CH_2)_{16}CH_3$$

COMPARATIVE EXAMPLE 6

Base Plate A, prepared as described in Example 1, was placed in a plasma reaction chamber having a vacuum

TABLE 1

| Sample No. | Base Plate | Silicone compound in the invention (Modifying compound) | Treatment condition (treatment time/temperature) Treatment (reaction atmosphere/contact time/temperature/catalyst) | $Si_{2p}/Co_{2p}^{3/2}$ |
|---|---|---|---|---|
| 1 | Invention A | (II)-3 | 1 min/90° C. | 0.1 |
| 2 | Invention A | (II)-3 | 20 min/50° C. | 0.12 |
| 3 | Invention A | (II)-7 | 20 min/50° C. | 0.12 |
| 4 | Invention A | (II)-3 (1-Octadecene) | 20 min/50° C. Isopropanol/10 minute dipping/40° C./chloroauric acid (50 ppm) | 0.12 |
| 5 | Invention A | (II)-3 (1-Docosene) | 20 min/50° C. Isopropanol/10 minute dipping/40° C./chloroauric acid (50 ppm) | 0.12 |
| 6 | Invention B | (II)-3 | 20 min/50° C. | 0.07 |
| 7 | Invention B | (II)-3 | 20 min/50° C. | 0.1 |
| 8 | Invention B | (II)-7 (1-Octadecene) | 20 min/50° C. Isopropanol/10 minute dipping/40° C./chloroauric acid (50 ppm) | 0.11 |

COMPARATIVE EXAMPLES 1 AND 2

Base Plate A, prepared as in Example 1 without using the silicone compound for use in the present invention, is defined as Comparative Sample No. 9, and Base Plate B having a carbon black protective layer, prepared as described above without using the silicone compound for use in the present invention for Base Plate A, is defined as Comparative Sample No. 10.

COMPARATIVE EXAMPLE 3

By coating the surface of the magnetic layer of Base Plate A, prepared as in Example 1, with 10 mg/m$^2$ of polydimethylsiloxane (having a kinematic viscosity at 20° C. of 100 cSt) as a lubricant in place of applying the vapor treatment with the silicone compound for use in the present invention, Comparative Sample No. 11 was prepared.

COMPARATIVE EXAMPLE 4

By coating the surface of the protective layer of Base Plate B, prepared as described above, with 10 mg/m$^2$ of ladder-type methylsiloxane (having a kinematic viscosity at degree of $5\times10^{-2}$ Torr, a mixed gas of a compound (Compound (b)), having the structure shown below, and $O_2$ was introduced into the plasma reaction chamber, and an electric power of 20 KHz and 20 watts was applied between parallel plate electrodes in the chamber to cause glow discharging. The pressure in the reaction chamber at discharging was 0.1 Torr.

Compound (b):

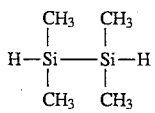

Thus, a plasma polymerized layer, having a thickness of 100 Å, was formed on the surface of the magnetic layer to provide Comparative Sample No. 14.

Then, after forming a back coating layer on the back surface of each of the magnetic recording sheet samples (thus-obtained by applying thereto a dispersion of carbon black in polyurethane/nitrocellulose), each sample was slit into a width of 8 mm.

Each magnetic recording tape obtained was evaluated as follows. Also, the atom number ratio of Si to Co of each sample was shown in Table 1.

(1) Contact Angle with Water:

a function of restricting the still reproducing time was omitted).

The results obtained are shown in Table 2.

TABLE 2

| Sample No. | | Base Plate | Silicone compound in the invention, etc. Modifying compound | Contact angle with water (degrees) | Residual Magneti- zation (Bm) | Friction coefficient (μ value) | | Repeating running durability (number) | Still durability (min.) |
|---|---|---|---|---|---|---|---|---|---|
| | | | | | | Condition (A) | Condition (B) | | |
| 1 | Invention 1 | A | (II)-3 | 95 | 93% | 0.22 | 0.28 | 300 or more | 30 or more |
| 2 | Invention 2 | A | (II)-3 | 105 | 96% | 0.22 | 0.24 | 300 or more | 30 or more |
| 3 | Invention 3 | A | (II)-7 | 106 | 97% | 0.22 | 0.23 | 300 or more | 30 or more |
| 4 | Invention 4 | A | (II)-3 1-Octadecene | 98 | 96% | 0.21 | 0.22 | 300 or more | 30 or more |
| 5 | Invention 5 | A | (II)-3 1-Docosene | 105 | 97% | 0.21 | 0.21 | 300 or more | 30 or more |
| 6 | Invention 6 | B | (II)-3 | 96 | 97% | 0.23 | 0.24 | 300 or more | 30 or more |
| 7 | Invention 7 | B | (II)-3 | 98 | 98% | 0.22 | 0.24 | 300 or more | 30 or more |
| 8 | Invention 8 | B | (II)-7 1-Octadecene | 100 | 98% | 0.21 | 0.21 | 300 or more | 30 or more |
| 9 | Comp. Ex. 1 | A | None | 55 | 60% | 0.38 | 0.5 or more | 2 | 2 |
| 10 | Comp. Ex. 2 | B | None | 68 | 65% | 0.26 | 0.45 | 5 | 5 |
| 11 | Comp. Ex. 3 | A | Lubricant coated | 85 | 72% | 0.29 | 0.5 or more | 160 | 4 |
| 12 | Comp. Ex. 4 | B | Lubricant coated | 85 | 68% | 0.28 | 0.5 or more | 140 | 7 |
| 13 | Comp. Ex. 5 | A | Compound (a) | 90 | 65% | 0.26 | 0.45 | 220 | 5 |
| 14 | Comp. Ex. 6 | A | Compound (b) | 80 | 68% | 0.29 | 0.46 | 200 | 12 |

A contact angle measuring apparatus ("CA-1", trade name, manufactured by Kyowa Kagaku K.K.) was used.

(2) Evaluation of Demagnetization (lowering of Bm) due to Storage of Sample for 7 Days at 60° C., 90% RH (residual magnetization):

The demagnetization was measured by a vibrating sample magnetometer (manufactured by Toei Kogyo K.K.) after applying an external magnetization of 5 KOe.

(3) Measurement of Friction Coefficient (μ value) to a Stainless Steel Rod (roughness 0.1 μm) at Condition (A) 40° C., 80% RH and Condition (B) 15° C., 10% RH:

The surface of the magnetic layer of each magnetic tape sample was brought into contact with the stainless steel rod at a tension ($T_1$) of 20 g and at a wrap angle of 180°, then the tension ($T_2$) necessary for pulling horizontally the magnetic tape through a free rotary roll at a speed of 14 mm/sec. was measured, and the abrasion coefficient (μ) was calculated from the value based on the following formula.

$$\mu=(1/\pi)\ln(T_2/T_1)$$

(4) Repeating Running Durability and Still Durability by an 8 mm type VTR at 5° C., 10% RH:

The repeating durability was that when the magnetic tape 50 meters in length was repeatedly reproduced by 8 mm type VTR ("improved HUJIX-8 Type M6", trade name, manufactured by Fuji Photo Film Co., Ltd.), the reproduced number, until the disturbance of images by the running instability or the stop of running by the increase of the friction coefficient occurred, was defined as the running durability. Also, the still durability was evaluated by measuring the time until images were not reproduced after pushing a pose button at image-reproducing by the same type of VTR (wherein As is apparent from the results shown in Table 2, it has been confirmed that by the vapor phase contact with the specific silicone compound for use in the present invention, the polymer of the present invention, that is, the silicone polymer, is formed on the surface of the magnetic recording medium. Also, it has been clarified that the metal thin layer type magnetic recording medium having the polymer of the present invention formed on the surface and/or the metal thin layer type magnetic recording medium with a protective layer having the polymer layer of the present invention formed on the surface, said polymer layer being further reacted with a carbon-carbon unsaturated compound which is the modifying compound, is excellent in the weather resistance and/or the running property when exposed to a variety of environmental conditions as compared with the comparative samples. For example, the features of the present invention are realized when the present invention is exposed to high and low humidity.

As described above, the metal thin layer type magnetic recording medium, having the layer of the polymer of the silicone compound represented by the foregoing formula (I) formed on the surface of the ferromagnetic metal thin layer thereof or the surface of the protective layer formed on the ferromagnetic metal thin layer by bringing the silicone compound into contact with the surface in the vapor phase, has excellent weather resistance and/or excellent adaptability to temperature and humidity, running property, and durability, as compared with using conventionally investigated lubricants for metal thin layer type magnetic recording media.

Also, by bonding a modifying compound having a desired functional group to the Si-H moieties which is present in the polymer of the foregoing polymer layer, the polymer layer of the present invention can be further provided with the more desired function.

While the invention has been described in detail and with reference to specific examples thereof, it will be apparent to one skilled in the art that various changes and modifications can be made therein without departing from the spirit and scope thereof.

What is claimed is:

1. A metal thin layer magnetic recording medium comprising a non-magnetic support having formed thereon (1) a ferromagnetic metal thin layer or (2) a ferromagnetic metal thin layer and a protective layer formed on said ferromagnetic metal thin layer, wherein a layer comprising a polymer of at least one chain or cyclic silicone compound is formed on the surface of said ferromagnetic metal thin layer or the protective layer by bringing said silicone compound into contact with said surface in the vapor phase; Co is contained in the magnetic layer and an atomic number ratio ($Si_{2p}/Co_{2p}^{3/2}$) of Si in the polymer and Co in the magnetic layer is from 0.02 to 0.30; and said silicone compound is represented by formula (I):

$$(R^1HSiO)_a(R^2R^3SiO)_b(R^4R^5R^6SiO_{1/2})_c \qquad (I)$$

wherein $R^1$, $R^2$, and $R^3$ each represents a hydrogen atom or a substituted or unsubstituted hydrocarbon group having from 1 to 10 carbon atoms, $R^1$, $R^2$, and $R^3$ simultaneously are not a hydrogen atom; $R^4$, $R^5$, and $R^6$ each represents a hydrogen atom or a substituted or unsubstituted hydrocarbon group having from 1 to 10 carbon atoms; a and b each represents an integer of 0 or more; and c represents 0 or 2, when c is 0, the silicone compound is a cyclic compound, when c is 2, the silicone compound is a chain compound, and when c is 0, the sum of a and b is an integer of at least 3;

wherein said Si-H moiety of said polymer of said silicone compound represented by formula (I), formed on the surface of said ferromagnetic metal thin layer or the surface of said protective layer formed on the ferromagnetic metal thin layer, is further reacted with a compound having a carbon-carbon unsaturated bond; wherein the polymer of at least one chain or cyclic silicone compound has a molecular weight of at least 150,000; and, wherein the compound having a carbon-carbon unsaturated bond is a compound represented by formula (IV):

wherein $R^7$, $R^8$, $R^9$, and $R^{10}$, which can be the same or different, each represents a hydrogen atom, a halogen atom, a hydroxy group, a mercapto group, an acyloxy group, an alkoxy group, an amino group, a nitro group, a carboxy group, a sulfo group a $F[CF(CF_3)CF_2O]_{15}\text{-}COOCH_2\text{-}$ group or an unsubstituted hydrocarbon group having from 1 to 30 atoms.

2. The metal thin layer magnetic recording medium as in claim 1, wherein said cyclic silicone compound is represented by formula (II):

$$(R^1HSiO)_a(R^2R^3SiO)_b \qquad (II)$$

wherein the sum of a and b is an integer of from 3 to 6, and $R^1$, $R^2$, and $R^3$ each is a hydrocarbon group having from 1 to 6 carbon atoms.

3. The metal thin layer magnetic recording medium as in claim 1, wherein said chain silicone compound is represented by formula (III):

$$(R^1HSiO)_a(R^2R^3SiO)_b(R^4R^5R^6SiO_{1/2})2 \qquad (III)$$

wherein $R^1$, $R^2$, $R^3$, $R^4$, $R^5$, and $R^6$ each represents independently a hydrogen atom or a substituted or unsubstituted hydrocarbon group having from 1 to 6 carbon atoms, and the sum of a and b is from 3 to 6.

* * * * *